June 15, 1943.   C. N. BERGSTROM   2,321,892
HOOD FOR BATTERY CAPS
Filed March 3, 1941

Inventor
Carl N. Bergstrom
By
Attorney

Patented June 15, 1943

2,321,892

UNITED STATES PATENT OFFICE 2,321,892

HOOD FOR BATTERY CAPS

Carl N. Bergstrom, Portland, Oreg.

Application March 3, 1941, Serial No. 381,496

1 Claim. (Cl. 136—181)

This invention relates generally to storage batteries and particularly to a hood for a battery cap.

The main object of this invention is to construct a hood for a battery cap for storage batteries which will render their use less objectionable when placed under the hood of an automobile.

The second object is to construct a hood of the class described in which the fumes from the battery and any splash which may occur will not injure the power plant of the automobile.

The third object is to construct a hood of the class described which will act as an auxiliary gasket over the regular filler cap and at the same time prevent any of the acid which may escape from the breather opening in the cap from injuring the motor or parts of the automobile.

The fourth object is to construct a device of the class described which will automatically seal the battery if it is turned on its side or inverted, and thereby prevent the escape of the liquid therefrom.

These and other objects are accomplished in the manner set forth in the following specification as illustrated in the accompanying drawing, in which.

Similar numerals refer to similar parts throughout the several views.

Figure 3:
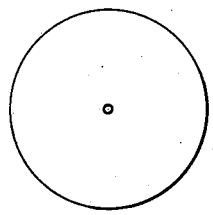
Fig. 3 is a plan of Fig. 2.
Figure 4:
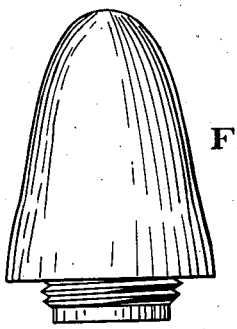
Fig. 4 is a side elevation of Fig. 2.

Referring in detail to the drawing, there is shown a battery box 10 with the usual terminals 11 and 12 and connectors 13. The filler openings are closed by the conventional forms of filler caps 14, whose heads 15 are provided with the breather openings 16.

Figure 2:
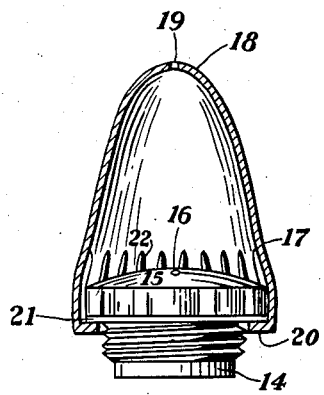
Fig. 2 is a vertical section through one of the hoods showing a filler cap in elevation.
Figure 6:
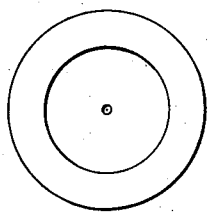
Fig. 6 is a bottom view of Fig. 5.

Referring particularly to my invention, same will be seen to consist of a somewhat cylindrical bullet-shaped hood 17 preferably of an elastic material such as rubber which is acid resistant, having the rounded point 18 at its upper end provided with a perforation 19 which acts as a breather opening 19. The lower end 20 is inturned as shown in Fig. 2 and engages the under side of the filler cap head 15 and the under side of the washer 21.

It is desirable to provide ribs 22 on the interior of the hood 17 for the purpose of providing air passageways for those filler caps which have their breather openings in the outer edge of the cap instead of in the end thereof as shown.

Figure 7:
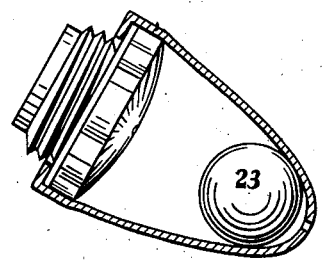
Fig. 7 is a longitudinal section through the preferred form of the device embodying the self-sealing feature.
Figure 1:
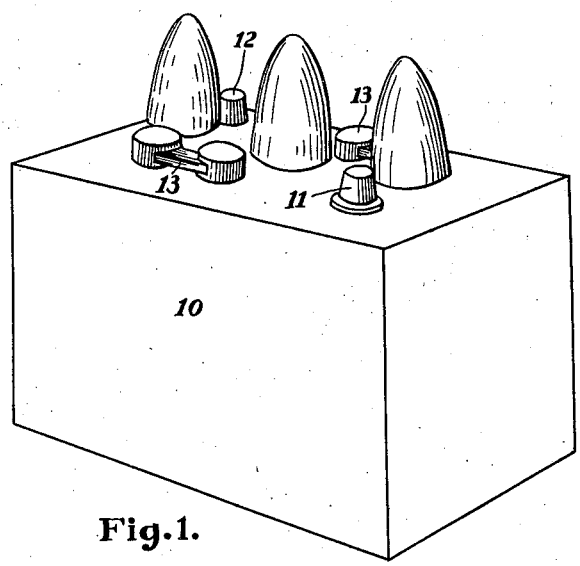
Fig. 1 is a perspective view showing a storage battery with my devices in position thereon.

In Fig. 7 is illustrated the same form of the device with the addition of the spherical ball check 23 which is of some metal not readily affected by the acid normally carried in storage cells.

It can be seen from the foregoing that no change need be made in the storage cell 10 itself or in the filler cap 14 normally used thereon, it being only necessary to slip a hood 17 over each cap 14 and then placing the filler cap in position.

Figure 5:
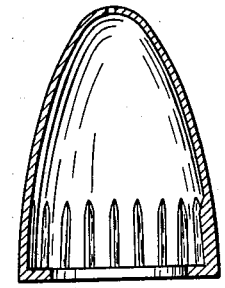
Fig. 5 is a vertical section through the hood with the filler cap removed therefrom.

It will be noted in Fig. 2 that the form of the member 17 is slightly different from that shown in Fig. 5. This is due to the fact that the filler cap 14 tends to expand the hood away from a cylindrical form.

It will be understood that in several types of battery caps now in use, the breather hole 16 is on the knurled side of the cap. Obviously this would prohibit the use of the applicant's cap were it not for the ribs 22. In addition thereto, the ribs 22 provide a driving connection between the hood 17 and the cap 14.

I claim:

A hood for battery caps consisting of a hollow, bullet shaped member having a perforated, pointed upper end and an inturned flange formed at the lower opposite end forming an opening through which the body of a battery filler cap can pass permitting the head of said filler cap to be enclosed by said hood and causing said flanged end to act as a gasket between said filler cap and the periphery of the filler opening, said hood being characterized by having ribs formed on the interior thereof adjacent to said flange adapted to insure breathing space between the exterior of the filler cap and the interior of the hood.

CARL N. BERGSTROM.